United States Patent
Viikari et al.

(10) Patent No.: US 9,244,162 B2
(45) Date of Patent: Jan. 26, 2016

(54) METHOD, SYSTEM AND COMPUTER PROGRAM PRODUCT FOR RANGING RFID TAGS

(75) Inventors: Ville Viikari, Espoo (FI); Pekka Pursula, Espoo (FI)

(73) Assignee: Teknologian Tutkimuskeskus VTT (FI)

(*) Notice: Subject to any disclaimer, the term of this patent is extended or adjusted under 35 U.S.C. 154(b) by 214 days.

(21) Appl. No.: 13/639,104

(22) PCT Filed: Apr. 8, 2011

(86) PCT No.: PCT/FI2011/050306
§ 371 (c)(1),
(2), (4) Date: Nov. 1, 2012

(87) PCT Pub. No.: WO2011/124768
PCT Pub. Date: Oct. 13, 2011

(65) Prior Publication Data
US 2013/0038428 A1    Feb. 14, 2013

(30) Foreign Application Priority Data
Apr. 9, 2010  (FI) ..................................... 20105366

(51) Int. Cl.
*H04Q 5/22*        (2006.01)
*G01S 13/75*       (2006.01)
*G01S 13/84*       (2006.01)

(52) U.S. Cl.
CPC ............... *G01S 13/756* (2013.01); *G01S 13/84* (2013.01)

(58) Field of Classification Search
CPC ................................................... G06K 7/0008
USPC ..................... 340/10.1, 10.4, 12.51
See application file for complete search history.

(56) References Cited

U.S. PATENT DOCUMENTS

| | | | |
|---|---|---|---|
| 7,817,014 B2* | 10/2010 | Krishna et al. ............... | 340/10.4 |
| 7,889,096 B2* | 2/2011 | Breed ......................... | 340/12.51 |
| 8,446,254 B2* | 5/2013 | Carrick et al. ............... | 340/10.1 |
| 2007/0018792 A1* | 1/2007 | Taki et al. .................... | 340/10.1 |
| 2007/0023520 A1* | 2/2007 | Miyashita .................... | 235/451 |
| 2007/0296586 A1* | 12/2007 | Mickle et al. ............... | 340/572.1 |
| 2008/0077255 A1 | 3/2008 | Gila et al. | |
| 2008/0143584 A1 | 6/2008 | Shoarinejad et al. | |

(Continued)

FOREIGN PATENT DOCUMENTS

| JP | 2008/153715 | 7/2008 |
|---|---|---|
| WO | WO 2007/085517 | 8/2007 |

OTHER PUBLICATIONS

Arnitz, et al.; "Multifrequency Continuous-Wave Radar Approach to Ranging in Passive UHF RFID"; IEEE Transactions on Microwave Theory and techniques; vol. 57, No. 5, May 2009.

(Continued)

*Primary Examiner* — Benjamin C Lee
*Assistant Examiner* — Israel Daramola

(57) ABSTRACT

The invention relates to a method for ranging a radio frequency tag, comprising measuring the modulated backscattering response of the tag at a plurality of frequencies using reader and determining the dispersive properties of the tag from the amplitude of the measured backscattering response. Further, the method comprises determining a position parameter of the tag from the measured modulated backscattering response and the determined dispersive properties of the tag.

15 Claims, 3 Drawing Sheets

(56) References Cited

U.S. PATENT DOCUMENTS

| | | | |
|---|---|---|---|
| 2009/0146793 A1* | 6/2009 | Fullerton | 340/10.4 |
| 2009/0215408 A1 | 8/2009 | Evers et al. | |
| 2009/0309780 A1 | 12/2009 | Albert et al. | |
| 2010/0109844 A1 | 5/2010 | Carrick et al. | |
| 2014/0049421 A1* | 2/2014 | Grosinger et al. | 342/146 |

OTHER PUBLICATIONS

Nikkari, et al.; "Performance of a Passive UHF RFID Tag in Reflective Environment";IEEE; 978-1-4244-2042; Jan. 2008.

PCT Application PCT/FI2011/050306; filing date Apr. 8, 2011; Teknologian tutkimuskeskus VTT et al.; International Search Report mailed Jul. 18, 2011.

* cited by examiner

METHOD, SYSTEM AND COMPUTER PROGRAM PRODUCT FOR RANGING RFID TAGS

FIELD OF THE INVENTION

The invention relates to radio frequency identification (RFID) technology. In particular, the invention relates to a method and system for ranging RFID tag or transponders, that is, for measuring the distance and/or location of the tag or transponder.

BACKGROUND OF THE INVENTION

Advanced RFID technology based on integrated circuits (IC) provides very sophisticated tags with non-volatile rewritable memory and anti-collision protocols. The cost of tags is low due to their high manufacturing volumes and the RFID technology is widely adapted to applications where identification is required.

Despite of the several advances of the RFID technology, it still suffers from a few limitations, such as a possibility to precisely locate a tag spatially. So far, a few solutions are proposed for solving this problem. First, a tag could be spatially localized by using several, spatially distributed antennas with phase-shifters in the reader device and scanning a volume with the antenna beam or spot. The spatial resolution of the antenna array depends on its electrical size, and is typically low at relatively low UHF-frequencies. At those frequencies, high resolution would necessitate impractically large antenna arrays to the reader.

One tag ranging technique is based on amplitude measurement of backscattered signal. In this technique, the reader device uses the received signal strength indicator (RSSI) to calculate the distance of the tag. This method, however, assumes that the tag properties are known in terms of its modulation index, antenna gain, and antenna impedance match. As a consequence, several unknown effects, such as tag antenna impedance mismatch due to proximity of metal or dielectric material or tag position, cause a large error to the measured distance of the tag.

The third proposed technique for ranging RFID tags is based on exploitation of the reader device as a stepped-frequency CW radar [D. Arnitz, K. Witrisal, and U. Muehlmann, "Multifrequency continuous-wave radar approach to ranging in passive UHF RFID," *IEEE Transactions on Microwave Theory and Techniques*, Vol. 57, No. 5, pp. 1398-1405, May 2009]. In this method, the tags response is measured at several different frequencies and its distance is solved taking the inverse Fourier-transform of the measured frequency response. A drawback of the method is that it requires the frequency response of the tags modulated reflection coefficient. Therefore, the method can only be used with previously characterized tags. Also US 2009/0309780 discloses a method for distance measurement and data transmission in a continuous wave radar system, which suffers from the same disadvantage.

SUMMARY OF THE INVENTION

It is an aim of the invention to solve at least some of the abovementioned problems and to provide a new method for ranging an RFID tag. A particular aim is to achieve a method which can be used for previously uncharacterized tags.

It is also an aim of the invention to provide new measurement system and software for ranging RFID tags.

The aims are achieved with the method and system as defined in the independent claims.

In one aspect, the invention relates to a method for ranging a radio frequency tag, comprising measuring the modulated backscattering response of the tag at a plurality of frequencies using reader and determining the dispersive properties of the tag from the amplitude of the measured backscattering response. Further, the method comprises determining a position parameter of the tag from the measured modulated backscattering response and the determined dispersive properties of the tag.

According to one embodiment, the method comprises
  measuring the threshold power of the tag at a plurality of frequencies using a reader,
  determining the dispersive properties of the tag from the measured threshold power,
  measuring the modulated backscattering response of the tag at the threshold power at a plurality of frequencies using reader, and
  determining the a position parameter of the tag utilizing the measured modulated backscattering response and the determined dispersive properties of the tag.

According to one embodiment of the invention the ranging is performed by measuring the modulated backscattering response of the tag at a plurality of frequencies using a power corresponding to the threshold power of the tag and using the measured modulated backscattering response to determine at least one position parameter relating to the tag using Fourier transform.

In general, the present method is based on the idea of utilizing the dispersive properties of the tag. As will be discussed later in this application in more detail, the dispersive properties can be found out from the amplitude of the measured backscatter response at any power level above the threshold level of the tag or, even more accurately by determining the threshold power of the tag. In the latter option, it is beneficial if the backscattering response at the plurality of frequencies is also measured at the threshold power level.

The position parameter referred to above is typically the distance of the tag from the reader.

The invention offers significant advantages. Most importantly, the method allows for ranging with no a priori information of the tags properties. In addition, the method can be used to measure the distance of an RFID tag using the standard readers with only software modifications.

The invention solves the two main problems associated with phase-based ranging methods. The first is that the dispersive properties of the modulated reflection coefficient of the tag affect the distance determination and should therefore be known in advance using prior art methods. Second, the modulated reflection coefficient is sensitive to the received power by the tag, which affects the ranging result. No method to solve these issues is proposed in prior art. However, the present phase-based method is suitable for determining the distance of an RFID tag with unknown dispersive properties and power response.

Measurement at or in the vicinity of the power threshold level ensures that the properties of the tag remain unchanged and do not affect the determination of the distance.

The invention can be utilized in applications where RFD tags need to be precisely spatially localized. One example is insect tracking for biological studies.

In particular, the invention offer benefits in the United States where broader frequency band is allocated to RFID and consequently more frequencies are usable for the present measurement, which increases the accuracy of the method.

In one embodiment, the response of the tag is measured by the reader at several discrete frequencies at a power level corresponding to (i.e. at or in the vicinity of) the threshold power of the tag (this generally means that the power used for measurement is at maximum 3 dB higher than the real threshold power of the tag). The threshold power can be found using power scanning. It has been found by the inventors that the dispersive properties of the modulated reflection coefficient of the tag can be estimated from the measured power sensitivity and their effect can be compensated in the distance estimation.

As the frequency response of the modulated reflection response of the tag is typically not known, it is estimated by measuring the power sensitivity of the tag at different frequencies and finding the equivalent circuit of the tag using fitting, for example using the method described later in more detail.

The reader used is preferably an EPC-compatible reader.

According to one embodiment, the radio frequency tag is a passive UHF RFID tag.

According to one embodiment, the position parameter determined is the distance between the tag and the reader. However, the present ranging method enables also two or three dimensional positioning of the tag using for example triangulation, i.e. at least two reader antennas arranged at a distance from each other.

According to one embodiment, the transmit power of the reader is gradually increased in order to find the threshold power of the tag. This is repeated at all frequency steps.

According to one embodiment, a modulated reflection coefficient of the tag is estimated based on the response measurement. The modulated reflection coefficient is further used for the distance determination through Fourier transform.

According to one embodiment, a difference between two reflection coefficient states of the tag is determined based on the response measurement. The difference is further used for the distance determination through Fourier measurement.

According to one embodiment, the Fourier transform is carried out for the ratio of difference between two reflection coefficient states and the modulated reflection coefficient, preferably using the formulas described later in more detail.

In order to achieve good accuracy, the plurality of frequencies preferably span a frequency range of at least 10 MHz, in particular at least 20 MHz.

If the spatial location of the tag is desired in more than one dimension, the method may comprise measuring modulated backscattering responses of the tag at a plurality of frequencies using at least two reader antennas placed at a distance from each other, and determining the location of the tag in at least two dimensions using the modulated backscattering responses.

The method can also be used for ranging a plurality of tags simultaneously by distinguishing the responses of the tags using their EPC codes, for example.

Next, embodiments and advantages of the invention are discussed in more detail with reference to the attached drawings.

DETAILED DESCRIPTION OF EMBODIMENTS

In the present document a phase-based method for determining the distance of RFID tag with unknown dispersive properties and power response is described.

Figure 6:
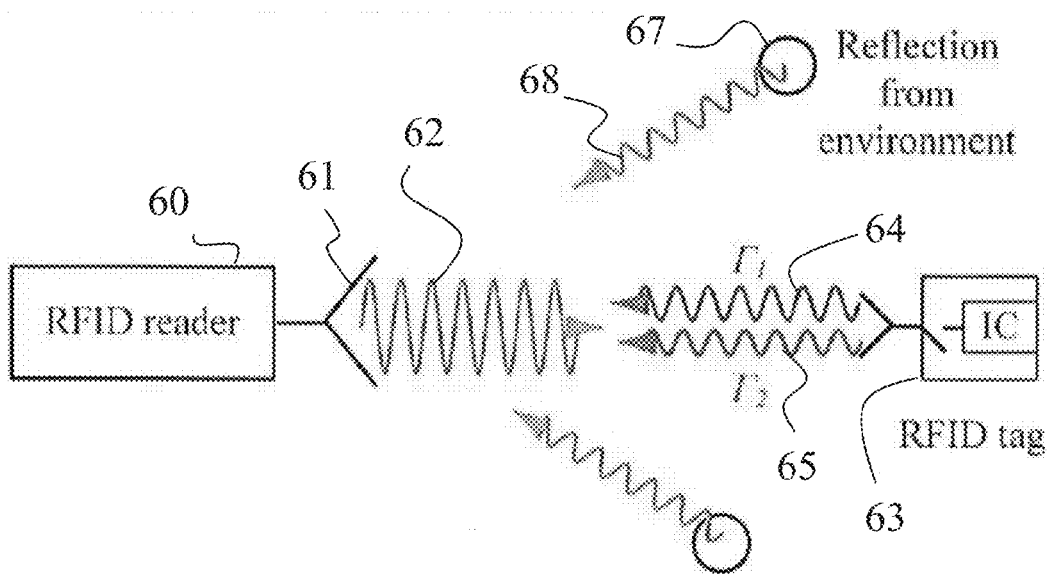
FIG. 6 shows an RFID reader and tag configuration.

FIG. 6 shows the basic principle of the invention according to one embodiment. An RFID reader transmits an excitation signal 62 through a reader antenna 61. The excitation signal wakes up the RFID tag 63, which responds by sending two response signals 64 and 65 corresponding to the different two reflection states $\Gamma_1$ and $\Gamma_2$ having different reflection coefficients. The response is read by the reader and the modulated reflection coefficient $\Delta\Gamma(\omega)$ is obtained (see more details below) as the signal difference.

In practical situations, the measurement is also affected by reflection signals 68 from the environment 67.

Next, the physical principle and practical implementation of the present method are explained more closely.

Ranging Principle

Frequency Response of the Tag

Consider an RFID tag at a distance z from the reader. The reader illuminates the tag by a CW and the tag produces modulated backscattering by switching its reflection coefficient between two states, $\Gamma_1$ and $\Gamma_2$. The corresponding signal difference between the two states at the reader device is $$\Delta Y(\omega) = (\Gamma_1(\omega) - \Gamma_2(\omega))Ae^{-j\frac{2\omega}{c}z} = \Delta\Gamma(\omega)Ae^{-j\frac{2\omega}{c}z}, \quad (1)$$

where A is the unknown two-way signal attenuation, $\omega=2\pi f$ is the angular frequency and C is the speed of light. Solving the distance z from $\Delta Y(\omega)$ necessitates that the modulated reflection coefficient $\Delta\Gamma(\omega)$ is known.

Modulated Reflection Coefficient of the Tag

Figure 1:
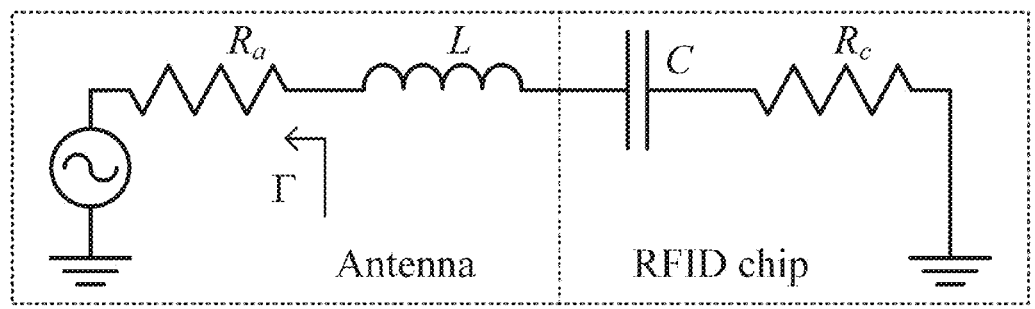
FIG. 1 shows electrical equivalent circuit of the RFID antenna and chip.

Let us represent an RFID tag with the electrical equivalent circuit shown in FIG. 1. The capacitive RFID chip is modeled with a series resistance $R_c$ and a capacitance C and the antenna is represented with a series resistance $R_a$ and an inductance L.

The tag modulates its reflection coefficient by switching the capacitance between two states: C and C±$\Delta$C. Note that the capacitance change direction between the two states is assumed unknown and can be either positive or negative. The modulated reflection coefficient is given as $$\Delta\Gamma(\omega) = \frac{Z_{c1} - Z_a^*}{Z_{c1} + Z_a} - \frac{Z_{c2} - Z_a^*}{Z_{c2} + Z_a}, \quad (2)$$

where $Z_{c1}=R_c+1/(j\omega C)$, $Z_{c2}=R_c+1/(j\omega(C\pm\Delta C))$, $Z_a=R_a+j\omega L$, and * denotes complex conjugate. When $\Delta C \ll C$, equation (2) can be approximated as $$\Delta\Gamma(\omega) \approx \frac{\mp j2\omega R_a \Delta C}{(1-\omega^2 LC + j\omega(R_a+R_c)C)^2} \quad (3)$$

$$= \frac{\mp j2\omega R_a \Delta C}{(1-\omega^2/\omega_{res}^2 + j\omega/(Q_L\omega_{res}))^2},$$

where the resonance frequency is $\omega_{res}=1/\sqrt{LC}$ and the loaded quality factor $Q_L=1/(\omega_{res}C(R_a+R_c))$. The phase of the modulated reflection coefficient is $$\angle\Delta\Gamma(\omega) = \tan^{-1}\left\{\frac{\mathrm{Im}\{\Delta\Gamma(\omega)\}}{\mathrm{Re}\{\Delta\Gamma(\omega)\}}\right\}. \quad (4)$$

Approximating equation (4) by the first order Taylor's expansion near the resonance gives $$\angle\Delta\Gamma(\omega) \approx \pm\pi/2 + \frac{4(\omega-\omega_{res})}{\omega_{res}^2 C(R_a+R_c)} \quad (5)$$

$$= \pm\pi/2 + \frac{4Q_L(\omega-\omega_{res})}{\omega_{res}}.$$

Substituting equation (5) into equation (1) gives $$\Delta Y(\omega) = |\Delta\Gamma(\omega)|A e^{-j\omega\left(\frac{2}{c}(z-z_{offset})\right)+j\left(\pm\frac{\pi}{2}4Q_L\right)}, \quad (6)$$

where $$z_{offset} = \frac{Q_L \lambda_{res}}{\pi}, \quad (7)$$

and $\lambda_{res}$ is the wavelength at the resonance frequency. For example, when the loaded quality factor of the tag is $Q_L=10$, the distance measurement error of z at 867 MHz is 1.1 m when $\Delta\Gamma(\omega)$ is neglected (assumed constant).

Power Sensitivity of the Tag

The power sensitivity of the tag (the threshold power that turns the tag on) is inversely proportional to the power dissipated in the chip resistance $R_c$ in FIG. 1, and can be written as [P. Pursula, M. Hirvonen, K. Jaakkola, and T. Varpula, "Antenna effective aperture measurement with backscattering modulation," *IEEE Transactions on Antennas and propagation*, Vol. 55, No. 10, pp. 2836-2843, October 2007]

$$P_{tag}(\omega) \sim (R_a+R_c)^2 + (\omega L - 1/(\omega C))^2 \quad (8)$$

$$\sim 1 + Q_L^2 \frac{\omega^2}{\omega_{res}^2}\left(\frac{\omega^2}{\omega_{res}^2}-1\right)^2.$$

Distance Estimation of the Tag

In the proposed distance estimation method, the reader device records the response of the tag at several discrete frequency points at the power sensitivity of the tag. The power sensitivity is measured at all frequencies by gradually increasing the transmit power and detecting the first reply from the tag. The tag parameters, $\omega_{res}$ and $Q_L$ are then estimated using the following least squares fit $$\min_{\omega_{res},Q_L,B} \sum_\omega \{(BP_{tag,meas}(\omega)-P_{tag}(\omega))^2\}, \quad (9)$$

where B is the unknown signal attenuation due to the free-space and other loss, $P_{tag,meas}(\omega)$ is the measured power sensitivity of the tag, and $P_{tag}(\omega)$ is given by equation (8).

The tag parameters obtained from formula (9) are used to estimate the modulated reflection coefficient with equation (3). Note that $R_a$ and $\Delta C$ does not affect the frequency behavior of the modulated reflection coefficient and can be set to one. Hence the fit concerns finding the resonance frequency and the quality factor of the tag.

The distance z is obtained using Fourier transform $$\max_z\left\{\left|\int \frac{\Delta Y_{meas}(\omega)}{\Delta\Gamma_{est}(\omega)}e^{j\frac{2\omega}{c}z}d\omega\right|\right\}, \quad (10)$$

where $\Delta Y_{meas}(\omega)$ is the measured difference signal between the two reflection coefficient states of the tag and $\Delta\Gamma_{est}(\omega)$ is the modulated reflection coefficient of the tag obtained from formulas (9) and (3). When the computing power is limited, the linear approximation of the distance correction term given in equation (7) can be used.

There is a constant phase ambiguity of $\pi$ in the estimated modulated reflection coefficient $\Delta\Gamma_{est}(\omega)$ (the term $\pm\pi/2$ in equation (6)). This phase-term does not affect the absolute value of the Fourier transform given in equation (10) nor the estimated distance z.

The effective impedance of the RFID chip depends on the applied power and therefore the modulated reflection coefficient of the tag is also power dependent. The response of the tag is always measured at the power sensitivity of the tag, which ensures that the properties of the tag remains unchanged and does not affect the estimated distance.

The proposed method enables ranging all the tags within the reader field simultaneously using standard inventory procedure, because the tag responses can be distinguished by their EPC codes. Also standard reader hardware can be used. The method requires only that the transmit power can be adjusted and that the phase of the difference signal $\Delta Y$ can be measured.

The accuracy of the method depends on the bandwidth, the signal-to-noise ratio, and the level of multipath propagation. The effect of these parameters on the distance measurement accuracy of RFID to is analyzed in the reference [D. Arnitz, K. Witrisal, and U. Muehlmann, "Multifrequency continuous-wave radar approach to ranging in passive UHF RFID," *IEEE Transactions on Microwave Theory and Techniques*, Vol. 57, No. 5, pp. 1398-1405, May 2009]. The accuracy of the method is limited in Europe, where only a narrow band (865 MHz 868 MHz) is allocated to UHF RFID, but will be better especially in the USA, where the available UHF RFID band ranges from 902 MHz to 928 MHz. It should be noted also that the method could provide very high accuracy in special applications where the frequency allocations can be exceeded.

Alternative Method

The above disclosure relates to a method for measuring the distance of an RFID tag with unknown dispersive properties and power response. The method necessitates that the power sensitivity of the tag is measured at several frequencies. The method provides a very accurate result, but may be too slow and require too complex reader (possibility to adjust power in order to find the threshold power of the tag) for some applications. The dispersive properties of the tag and its distance can also be measured in an alternative way, using an arbitrary power above the threshold power of the tag as disclosed in the following.

When the properties of the tag do not change considerably with power applied, or a fast distance estimation of the tag is needed, the dispersive properties of the tag can be estimated from its modulated backscattering coefficient. In that case, the tag parameters $\omega_{res}$ and $Q_L$ estimated using the following least squares fit $$\min_{\omega_{res},Q_L,B} \sum_{\omega} \{(B|\Delta\Gamma_{meas}(\omega)| - |\Delta\Gamma(\omega)|)^2\} \quad (11)$$

where B is the unknown signal attenuation due to the free-space and other loss, $\Delta\Gamma_{meas}(\omega)$ is the measured power sensitivity of the tag, and $\Delta\Gamma(\omega)$ is given as $$\Delta\Gamma(\omega) \approx \frac{\mp j2\omega R_a \Delta C}{(1 - \omega^2 LC + j\omega(R_a + R_c)C)^2} \quad (12)$$
$$= \frac{\mp j2\omega R_a \Delta C}{(1 - \omega^2/\omega_{res}^2 + j\omega/(Q_L\omega_{res}))^2},$$

In this method, also power levels significantly higher than the threshold power of the tag, in particular more than 3 dB above the threshold level, can be used (although less than 3 dB is possible too). The inventors have found that in most cases the relevant properties of RFID tags do not change with the power applied too much, whereby the ranging result is accurate enough for many applications.

On other respects, the alternative method can be carried out as disclosed above.

EXAMPLES

Measurement Setup

Figure 2:
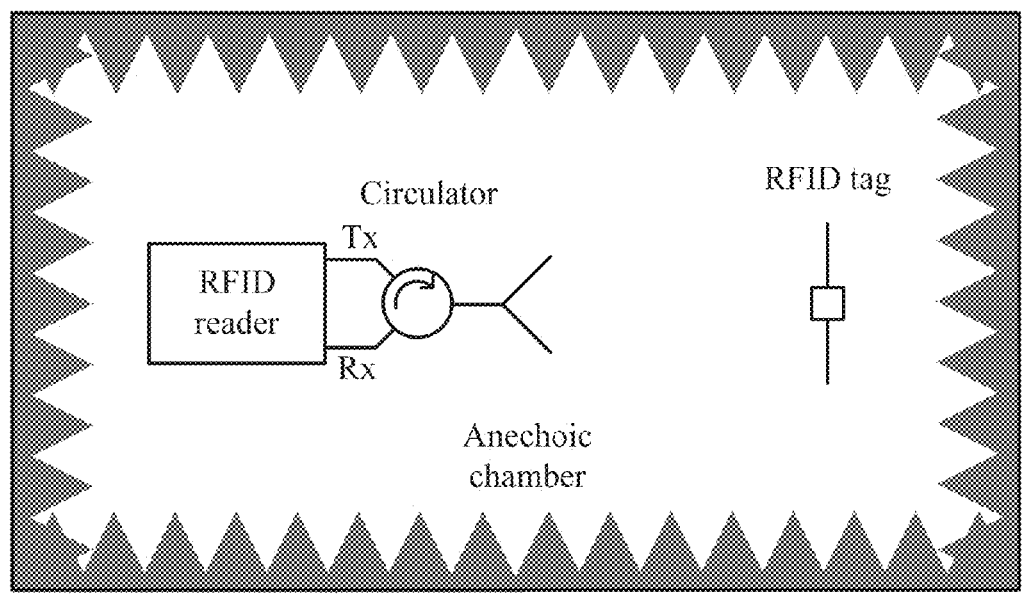
FIG. 2 illustrates an experimental measurement setup for measuring the distance of an RFID tag.
Figure 3:
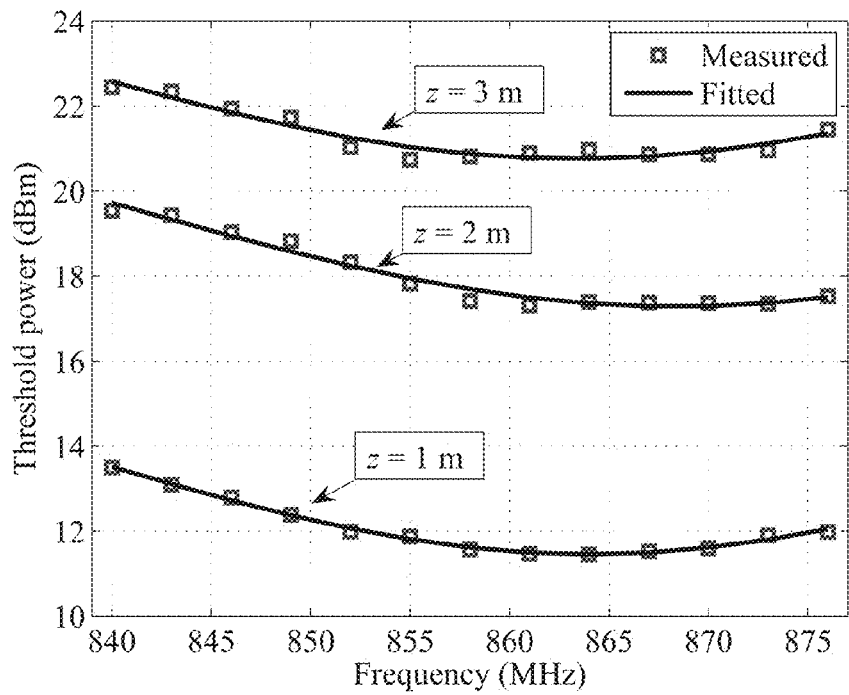
FIG. 3 shows a graph of a measured and fitted power sensitivity of the tag as a function of the frequency. Different lines are for different distances.

The distance estimation method is experimentally tested in an anechoic chamber using an RFID test equipment (Tagfortnance lite 2.0 by Voyantic Oy, Finland) as a reader device, see FIG. 2. The transmit and receive channels of the RFID test device are coupled to a single reader antenna (SPA 8090/75/8/0/V by Huber+Suhner) through a circulator (V2 by Huber+Suhner) and the tested RFID tag is placed on a movable holder. The tag antenna is comprised of two shorted patches and it measures 88×30×3 mm. The tag is equipped with the Monza 2 (Impinj, Inc.) RFID chip. The response of the tag is measured from 840 MHz to 876 MHz with 3 MHz interval (13 frequency points) at the distances from 0.3 m to 4.7 m.

Estimated Parameters of the Tag

The measured power sensitivity of the tag at 1, 2, and 3 no distances are shown in 3 with the fitted curves. The best fit is obtained at 1 m due to the best signal-to-noise ratio but the deviations are relatively low even at 3 m distance.

Figure 4:
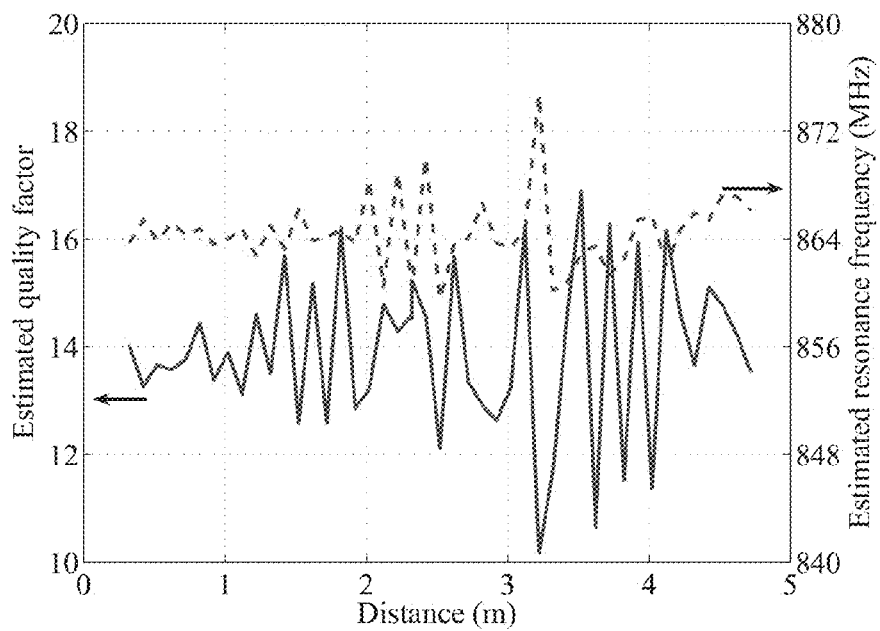
FIG. 4 shows a graph of an estimated quality factor and the resonance frequency of the tag at different distances.

FIG. 4 shows the estimated quality factor and the resonance frequency of the tag at different distances. The average of the estimated resonance occurs at approximately 864 MHz with maximum deviations of +10 MHz and −4 MHz. The estimated quality factor ranges from 10 to 17 and its average is 14.

Estimated Distance of the Tag

Figure 5:
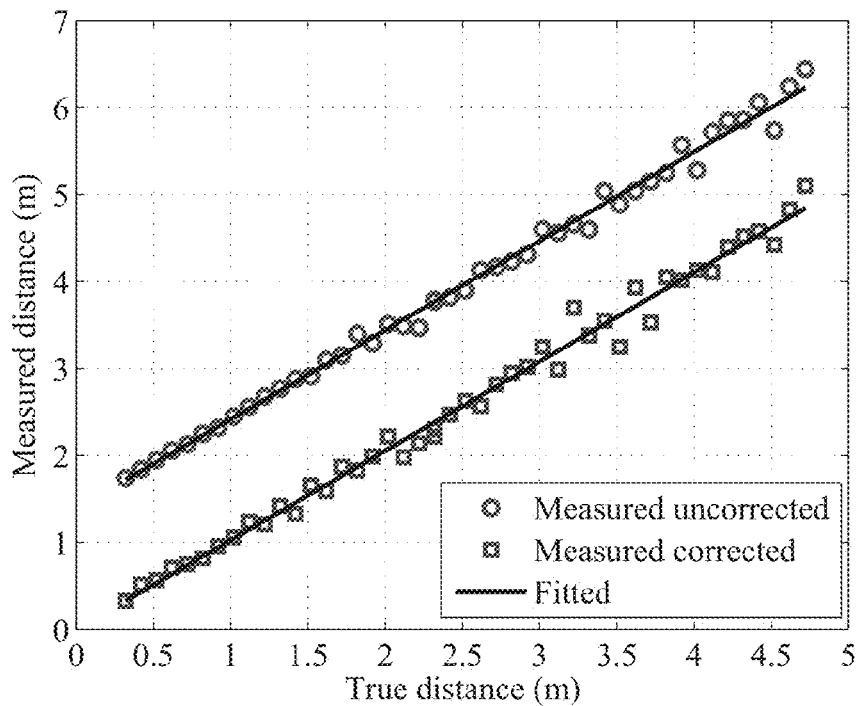
FIG. 5 shows a graph of estimated uncorrected (red circles) and corrected (blue squares) distances of the tag as a function of the true distance.

The estimated distance of the tag as a function of the true distance is shown in FIG. 5. The red circles show the uncorrected distance estimate, in this distance, the dispersive properties of the tag are not taken into account in (9), in other words, $\Delta\Gamma_{est}(\omega)$ is assumed constant. The corrected distance obtained with the method proposed in this paper is shown with blue squares. Black lines are linear fits to both data.

The distance offset between the corrected and uncorrected results is approximately 1.4 m. This agrees well with the theoretically derived linear approximation for the offset distance, which is $z_{offset} = Q_L \lambda_{res}/\pi = 1.5$ m at 867 MHz with $Q_L = 14$.

The variation in the corrected distance estimate is slightly larger than that in the uncorrected distance estimate due to the uncertainty in estimating the quality factor and the resonance frequency of the tag. However, the distance measurement accuracy in this experiment is relatively good as the mean absolute error in the corrected data is 68 mm.

In the above a phase-based method is described for determining the distance of an RFID tag with unknown properties. In this method, the reader records the response of the tag at different frequencies at the threshold power of the tag. The dispersive properties of the modulated reflection coefficient are estimated from the measured power sensitivity and are taken into account in the distance estimation. Implementing the method necessitates only that the transmit power of the RFID reader can be adjusted and that the phase of the difference signal can be measured. Thus only software modifications to the reader are required.

The method is experimentally verified at 860 MHz and it is found to provide accurate distance estimate the maximum error being 0.4 m. Better accuracy could be achieved by using larger bandwidth or longer integration time.

The invention claimed is:

1. A method for ranging a radio frequency tag, comprising measuring modulated backscattering response of the tag at a plurality of frequencies using a reader, and
determining at least one position parameter of the tag using the measured modulated backscattering response of the tag using Fourier transform, wherein said position parameter is a distance (max) between the tag and the reader, wherein the position parameter is determined using $$\max_z \left\{ \left| \int \frac{\Delta Y_{meas}(\omega)}{\Delta\Gamma_{est}(\omega)} e^{j\frac{2\omega}{c}z} d\omega \right| \right\},$$

wherein $\Delta Y_{meas}(\omega)$ is a measured difference signal between two reflection; states of the tag corresponding to two backscattering reflection coefficients, $\Delta\Gamma_{est}(\omega)$ is a modulated reflection coefficient of the tag, and $\omega$ is angular frequency of the modulated backscattering response of the tag,
wherein the method comprises
measuring said modulated backscattering response at each of said plurality of frequencies using a power which is at maximum 3 dB higher than a threshold power of the tag or more than 3 dB higher than the threshold power of the tag, wherein the modulated reflection coefficient of the tag is estimated using the modulated backscattering response.

2. The method according to claim 1, wherein the transmit power of the reader is gradually increased at said frequencies in order to find said threshold power of the tag.

3. The method according to claim 1, wherein a modulated reflection coefficient $\Delta\Gamma_{est}(\omega)$ of the tag is estimated based on the response measurement.

4. The method according to claim 1, wherein a difference $\Delta Y_{meas}(\omega)$ between two reflection states of the tag corresponding to two backscattering reflection coefficients is determined.

5. The method according to claim 1, comprising determining dispersive properties of the tag based on the amplitude of said modulated backscattering response and determining the at least one position parameter using the measured modulated backscattering response of the tag and the determined dispersive properties of the tag.

6. The method according to claim 1, wherein the radio frequency tag is a passive UHF RFID tag.

7. The method according to claim 1, wherein said plurality of frequencies span a frequency range of at least 10 MHz.

8. The method according to claim 1, comprising
measuring modulated backscattering responses of the tag at a plurality of frequencies using at least two reader antennas placed at a distance from each other, and
determining the location of the tag in at least two dimensions using the modulated backscattering responses.

9. The method according to claim 1, comprising ranging a plurality of tags simultaneously by distinguishing the responses of the tags.

10. A system for ranging a radio frequency tag, comprising
a reader for measuring modulated backscattering response of the tag at a plurality of frequencies, and
computing means for determining at least one position parameter of the tag using the measured modulated backscattering response of the tag using Fourier transform, wherein said position parameter is a distance $(\max_z)$ between the tag and the reader, wherein the position parameter is determined using $$\max_z\left\{\left|\int \frac{\Delta Y_{meas}(\omega)}{\Delta\Gamma_{est}(\omega)} e^{j\frac{2\omega}{c}z} d\omega\right|\right\},$$

wherein $\Delta Y_{meas}(\omega)$ is a measured difference signal between two reflection states of the tag corresponding to two backscattering reflection coefficients, $\Delta\Gamma_{est}(\omega)$ is a modulated reflection coefficient of the tag, and $\omega$ is angular frequency of the modulated backscattering response of the tag,
wherein
said reader is adapted to measure said modulated backscattering response at each of said plurality of frequencies using a power which is at maximum 3 dB higher than a threshold power of the tag or more than 3 dB higher than the threshold power of the tag, wherein the modulated reflection coefficient of the tag is estimated using the modulated backscattering response.

11. The system according to claim 10, wherein the reader is adapted to gradually increase the power from a power level lower than the threshold power of the tag in order to find the threshold power of the tag.

12. A computer program product stored on a non-transitory computer-readable data carrier for ranging a radio frequency tag, comprising
software means for reading measured modulated backscattering response data relating to the tag at a plurality of frequencies from a storage device, and
software means for determining at least one position parameter of the tag using the modulated backscattering response data using Fourier transform, wherein said position parameter is a distance $(\max_z)$ between the tag and the reader, wherein the position parameter is determined using $$\max_z\left\{\left|\int \frac{\Delta Y_{meas}(\omega)}{\Delta\Gamma_{est}(\omega)} e^{j\frac{2\omega}{c}z} d\omega\right|\right\},$$

wherein $\Delta Y_{meas}(\omega)$ is a measured difference signal between two reflection states of the tag corresponding to two backscattering reflection coefficients, $\Delta\Gamma_{est}(\omega)$ is a modulated reflection coefficient of the tag, and $\omega$ is angular frequency of the modulated backscattering response of the tag,
wherein computer program product further comprises
software means for controlling a radio frequency reader to measure said modulated backscattering response data at each of said plurality of frequencies using a power which is at maximum 3 dB higher than a threshold power of the tag or more than 3 dB higher than the threshold power of the tag, wherein the modulated reflection coefficient of the tag is estimated using the modulated backscattering response.

13. A method for ranging a radio frequency tag, comprising
measuring modulated backscattering response of the tag at a plurality of frequencies using a reader, and
determining dispersive properties of the tag from the amplitude of the measured backscattering response,
determining at least one position parameter of the tag using the measured modulated backscattering response of the tag using Fourier transform, wherein said position parameter is a distance $(\max_z)$ between the tag and the reader, wherein the position parameter is determined using $$\max_z\left\{\left|\int \frac{\Delta Y_{meas}(\omega)}{\Delta\Gamma_{est}(\omega)} e^{j\frac{2\omega}{c}z} d\omega\right|\right\},$$

wherein $\Delta Y_{meas}(\omega)$ is a measured difference signal between two reflection states of the tag corresponding to two backscattering reflection coefficients, $\Delta\Gamma_{est}(\omega)$ is a modulated reflection coefficient of the tag, and $\omega$ is angular frequency of the modulated backscattering response of the tag,
wherein the modulated reflection coefficient is estimated based on the modulated backscattering response.

14. The method according to claim 13, wherein said position parameter is the distance of the tag from the reader or antenna of the reader.

15. The method according to claim 13, comprising
measuring modulated backscattering responses of the tag at a plurality of frequencies using at least two reader antennas placed at a distance from each other, and
determining the location of the tag in relation to the reader antennas in at least two dimensions using the modulated backscattering responses.

* * * * *